Figure 1:
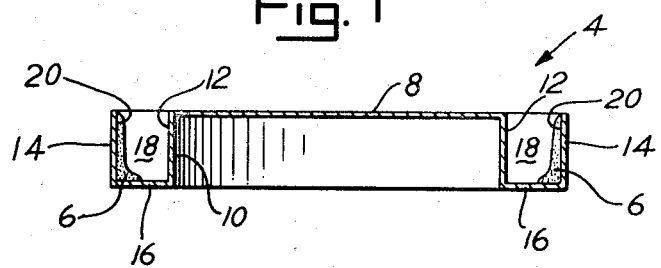

United States Patent

[11] 3,627,707

| [72] | Inventors | Donald A. Giessler;<br>FLoyd A. Ratliff, both of Muncie, Ind. |
|---|---|---|
| [21] | Appl. No. | 789,037 |
| [22] | Filed | Dec. 31, 1968 |
| [45] | Patented | Dec. 14, 1971 |
| [73] | Assignee | Ball Corporation<br>Muncie, Ind. |

[54] THIXOTROPIC POLYVINYL CHLORIDE PLASTISOL COMPOSITION
5 Claims, 2 Drawing Figs.

[52] U.S. Cl........................................................ 260/2.5 P,
215/40, 260/23 AR, 260/23 XA, 260/31.8, 260/41 R, 260/DIG. 37
[51] Int. Cl........................................................ C08f 29/18, C08f 45/04, C08f 45/38
[50] Field of Search........................................... 260/23 EP, 23 X, 41 R, 23 AR, 31.8 R

[56] References Cited
UNITED STATES PATENTS

| 3,231,529 | 1/1966 | Kuhn et al. | 260/23 |
| 3,231,531 | 1/1966 | Buckley et al. | 260/23 |
| 3,245,566 | 4/1966 | Szalay | 215/40 |
| 3,283,936 | 11/1966 | Kehe et al. | 215/40 |
| 3,356,625 | 12/1967 | Giessler | 260/23 |
| 3,370,104 | 2/1968 | O'Brien et al. | 260/837 |
| 3,381,837 | 5/1968 | Testa et al. | 215/40 |
| 3,383,337 | 5/1968 | Garling et al. | 260/2.5 |
| 3,492,231 | 1/1970 | McMillen | 252/33 |

OTHER REFERENCES

Werner et al., " Marvinol VR-53," United States Rubber Co., Naugatruck Chemical Div. Bulletin pages i– iii, and 1– 10, Sept. 1965.

*Primary Examiner*—Donald E. Czaja
*Assistant Examiner*—H. S. Cockeram
*Attorney*—Campbell, Harris & O'Rourke

ABSTRACT: A plastisol gasket-forming composition including both precipitated barium sulfate and water-ground barium sulfate having thixotropic properties so that the composition will remain where placed on a vertical surface.

PATENTED DEC 14 1971 3,627,707

INVENTORS
DONALD A. GIESSLER
BY & FLOYD A. RATLIFF

Campbell, Harris and O'Rourke

ATTORNEYS

THIXOTROPIC POLYVINYL CHLORIDE PLASTISOL COMPOSITION

This invention relates to a gasket composition, and more particular to a plastisol composition which is particularly useful in forming a gasket for hermetically sealing metal containers and the like.

Heretofore, difficulty has been encountered to hermetically sealing the closure ends and bodies of metal cases and the like. Various plastisol sealing compositions have been used in the past; however, these prior art compositions present one or more problems, such as chemical reactivity with food or other materials in the container; poor pouring properties, and short shelf life. Even those prior art sealing compositions which overcome these problems suffer from one common problem—that of an inability to properly hermetically seal a closure end to a container body under circumstances when the closure periphery is bent around the sealing bead of the container. This problem is attributable to the viscosity of the sealing composition, the handling time of the sealing composition and the effects of gravity on the sealing composition curing in situ. For example, when prior art plastisol sealing compositions are applied to the peripheral edge-defining vertical wall surface of the closure, these sealing compositions flow to the adjoining horizontal surface of the closure thereby minimizing the possibility of a hermetic seal between the closure and can.

With the present invention, these problems and difficulties, among others, of the prior art are substantially overcome by the provision of a plastisol sealing composition including a mixture of precipitated barium sulfate and water-ground barium sulfate as a filler which imparts thixotropic properties to the composition whereby the composition remains in a vertical position between the adjacent vertical walls of the container body and end closure. A feature of the present invention resides in the ability of such compositions to flow readily through existing plastisol-pouring equipment under pressure at normal room temperatures.

It is, therefore, an object of the present invention to provide new and improve plastisol gasket compositions.

Another object of the present invention is to provide new and improved plastisol gasket compositions that are particularly useful in producing gaskets for hermetically sealing end closures and bodies of metal containers and the like.

Still another object of the present invention is to provide new and improved plastisol sealing gasket compositions including both precipitated barium sulfate and water-ground barium sulfate.

A further object of the present invention is to provide new and improved vinyl plastisol gasket compositions including both precipitated barium sulfate and water-ground barium sulfate present in said composition in an amount sufficient to impart thixotropic properties to said composition.

A still further object of the present invention is to provide new and improved vinyl plastisol gasket compositions including both precipitated barium sulfate and water-ground barium sulfate, said sulfates being present in said composition as fillers in a relative ratio of about four parts water-ground barium sulfate to about one part of precipitated barium sulfate to impart thixotropic properties to said composition.

Figure 2:
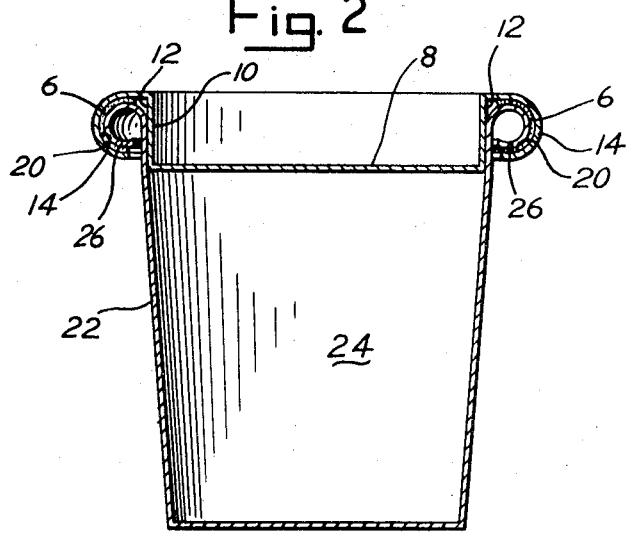

These and other objects, features and advantages of the present invention will become readily apparent from a careful consideration of the following detailed description, when considered in conjunction with the accompanying drawing, illustrating preferred embodiments of the present invention, wherein like reference numerals and characters refer to like and corresponding parts throughout the several views, and wherein:

FIG. 1 is a view in vertical cross section of an inverted circular end closure for a metal container body; and FIG. 2 is a view in vertical cross section of the end closure of FIG. 1 sealed with a gasket composition of the present invention and assembled with a flat-bottomed frustoconical container body.

Referring to FIG. 1 there is illustrated a formed circular end closure, generally indicated by the numeral 4, in an inverted position and so positioned to receive the plastisol sealing composition 6 of the present invention. The closure 4, as shown in its correct position in FIG. 2 includes a central circular portion 8 circumscribed by an inner vertical wall or ring 10 having an outer surface 12. The wall 10 defines with an outer vertical wall or ring 14 and a bottom wall 16 a circular trough or channel 18 for receiving the sealing or gasket composition 6 of the present invention.

In practice, the sealing composition is flowed through conventional pouring equipment at normal room temperature onto the inner surface 20 of the outer wall 14 and cured; the end closure and container body 22 (FIG. 2) are then assembled by insertion of the base portion 8 and wall 10 into the cavity 24 of the container body 22, and the wall 14 of the closure is bent in conventional pressure-bending equipment around an annular sealing bead 26 defining the upper periphery of the container body 22. When the wall 20 of the closure is being bent, the sealing composition is trapped between the wall 14 and the outer surface of the sealing bead 26 of the closure body where the sealing composition remains to provide an enhanced hermetic seal between the closure 4 and container body 22. The thixotropic properties of sealing compositions of the present invention maintain the compositions on the vertical sidewall surface 20 of the outer wall 14 of the closure 4 after the composition is applied thereto as indicated in FIG. 1 and these properties of the composition of the present invention maintain the composition on the sidewall 20 of the closure until cured. Prior art compositions, when applied to the sidewall surface would tend to flow from the wall 14 into the channel 18 and onto the horizontal base 16 providing an nonuniform thickness to the seal. The compositions of the present invention produce a gasket of substantially uniform thickness on the vertical wall 14 of the closure 4.

The gasket composition of this invention generally comprises a plastisol mixture including a vinyl polymer composition, a combination of plasticizers, and a filler consisting of both water-ground barium sulfate and precipitated sulfate. Water-ground barium sulfate is a well-known filler material used in preparing plastisols. Water-ground barium sulfate is included in such compositions because of cost, because of its pigmentation properties and because of its ability to alter physical properties of the composition, for example, producing additional cold flow properties which are useful when the composition is under pressure.

Precipitated barium sulphate, also well known in the art, has not been used heretofore as a filler alone because its extremely small particle size—less than 1 micron—results in plastisols of high viscosity. We have found that by employing both precipitated barium sulfate and water-ground barium sulfate as a filler, enhanced viscosity characteristics are achieved and the resulting sealing composition has thixotropic properties as well as enhanced cold flow properties when under pressure.

The vinyl polymer composition of the plastisol gasket composition according to the invention advantageously is formed by emulsion or suspension polymerization techniques, and then spray dried. The emulsion polymerization produces dense spherical particles having a diameter of the order of about 1–2 microns, while the suspension polymerization produces larger, e.g., about 10 microns, particles which are otherwise similar. The particles are easily dispersible in plasticizers, but not dissolved thereby until the temperature is raised to about 300°–400° F. In commercial practice they are most often polyvinyl chlorides or copolymers of vinyl chloride, for example, with vinyl acetate or vinylidene chloride, although other dispersible vinyl polymers, copolymers or mixtures can also be used. Copolymers are more likely to be produced by suspension polymerization, and homopolymers by emulsion polymerization.

Operable, preferred and optimum ranges of proportions of ingredients in the plastisol gasket composition according to the invention are within the approximate ranges set forth in table I, below:

TABLE I

|  | Operable | Parts Preferred | Optimum |
|---|---|---|---|
| Vinylpolymer composition | 100 | 100 | 100 |
| Plasticizer composition | 45–255 | 75–230 | 100–200 |
| Filler equivalent on a volume basis to the indictated number of parts of mixture of barium sulfate | 120–380 | 150–350 | 190–310 |

Operable, preferred and optimum proportions of the diester plasticizer and the epoxide plasticizer in the composition according to the invention are within the approximate ranges set forth in table II, below:

TABLE II

|  | Operable | Parts Preferred | Optimum |
|---|---|---|---|
| Diester | 45–105 | 60–90 | 75 |
| Epoxide | 45–105 | 60–90 | 75 |

Compositions according to the invention may contain additional ingredients such as lubricants, stabilizers or the like, which have been employed in previously known plastisol gasket compositions provided such ingredients do not adversely affect the unexpected cooperation among the several constituents which have been discussed above.

The following examples are presented solely for the purpose of further illustrating and disclosing the invention, and are in no way to be construed as limitations thereon.

EXAMPLE 1

The following procedure was employed in the formulation of a gasket composition according to the present invention utilizing a dispersible vinyl chloride resin such as the polyvinyl chloride resin VR–53, sold under that trademark by Uniroyal Inc. of Naugatuck, Conn., said polyvinyl chloride resin being an intermediate molecular weight plastisol resin having an average particle size of about 1.7 microns, a specific viscosity of about 0.36, a specific gravity of about 1.4, and having an apparent density of 15 lbs./ft.$^3$, said polyvinyl chloride resin being a homopolymer of vinyl chloride, di-2-ethylhexyl adipate plasticizer, an epoxidized soybean oil plasticizer, other ingredients such as pigments, lubricants and stabilizers, and both precipitated barium sulfate and water-ground barium sulfate, the latter two ingredients in the relative ratio of about four parts of water-ground barium sulfate to one part of precipitated barium sulfate.

A high-speed mixer was used to produce a uniform dispersion from the ingredients listed in table III below. The resultant composition was suitable for use in producing gasket closures by commercial techniques at room temperatures or at elevated temperatures.

TABLE III

| Formulation | Parts |
|---|---|
| PVC resin (VR–53) | 100 |
| Precipitated BaSO$_4$ (Blanc Fixe) | 50 |
| Water Ground BaSO$_4$ (Foam A) | 200 |
| Di-2-ethylhexyl adipate (DOA) plasticizer | 75 |
| Epoxidized soybean oil (G–62) plasticizer | 80 |
| Azobisformamide (Kempore 200) blowing agent | 2 |
| TiO$_2$ pigment | 3 |
| Dimethylpolysiloxane (L–45) silicone | 1 |
| Calcium Zinc stabilizer (Ferror 707X) | 1 |

The composition of table III was applied to the closure of an aluminum can and exhibited good flow characteristics while under pressure in the pouring equipment and exhibited thixotropic properties when so applied to the closure, as well as good cold flow properties when in the closure and can sealing process.

Satisfactory thixotropic properties have also been produced by the same method and from substantially the same ingredients, except that different epoxidized soybean oil plasticizers were used. These plasticizers varied in iodine number from 0.6 to 0.9, and in oxirane oxygen from 6.3 percent to 7.0 percent.

The dispersion according to the invention produced as described in example 1, above, was used to form a gasket in a closure for an aluminum can by injection about a 1,600 milligram portion thereof into a groove near the periphery of the closure, and heating the closure and the dispersion to a temperature of approximately 400° F. for about 1 minute.

EXAMPLE 2

The procedure described in example 1, above, has also been employed to produce other plastisol dispersion gasket compositions according to the invention. Representative formulations that have been used are set forth in table IV, below:

TABLE IV

|  | Plastisol Number | | | | | | | |
|---|---|---|---|---|---|---|---|---|
|  | 2 | 3 | 4 | 5 | 6 | 7 | 8 | 9 |
| Vinyl resin | [1] 100 | [1] 100 | [1] 100 | [1] 100 | [1] 100 | [1] 100 | [1] 100 | [1] 100 |
| Dibutyl sebacate | 25 |  |  |  |  |  | 50 | 25 |
| Dioctyl adipate |  |  | 50 |  |  |  |  |  |
| Diisooctyl adipate |  |  |  |  | 50 |  |  |  |
| Diisodecyl adipate |  |  |  | 50 |  |  |  |  |
| Diisobutyl adipate |  |  |  |  |  | 50 |  |  |
| Di-n-hexyl azelate |  |  |  |  |  |  |  | 50 |
| Expoxidized soybean oil | 105 | 105 | 105 | 105 | 105 | 105 | 105 |  |
| Expoxidized linseed oil |  |  |  |  |  |  |  | 102 |
| Barium sulphate combination | 125 | 380 | 250 | 125 | 300 | 195 | 300 | 100 |

[1] The polyvinyl chloride resin of Example 1 was used.

Although, various minor modifications and alterations of the present invention will be readily apparent to those versed in the art, it should be understood that what is desired to be embodied within the scope of the patent warranted hereon, are all such embodiments as reasonably and properly fall within the scope of the contribution to the art hereby made.

What is claimed is:

1. A gasket-forming composition for use with a closure comprising in parts by weight a thixotropic plastisol compositions as follows:

|  | PARTS |
|---|---|
| Polyvinylchloride | 100 |
| Precipitated BaSO$_4$ | 50 |
| Water Ground BaSO$_4$ | 200 |
| Di-2-ethylhexyl adipate plasticizer | 75 |
| Oxidized soybean oil plasticizer | 80 |
| Azobisformamide blowing agent | 2 |
| TiO$_2$ pigment | 3 |
| Dimethylpolysiloxane silicone | 1 |
| [Calcium Zinc stabilizer | 1] |

2. A thixotropic gasket composition for use with a closure comprising a plastisol mixture of:
   A. about 45 to 255 parts of plasticizer composition, consisting essentially of from about 45 to 105 parts diester plasticizer and from 45 to 105 parts epoxide plasticizer;
   B. about 100 parts of chloride resin dispersed in the plasticizer composition;

C. about 25 parts to 125 parts of precipitated barium sulfate; and
D. from about 50 parts to 325 parts of water-ground barium sulfate wherein the total of the barium sulfate materials is not more than 380 parts.

3. A composition as set forth in claim 2 wherein the ratio of water-ground barium sulfate to precipitated barium sulfate is about 4 parts of water-ground barium sulfate to about 1 part of precipitated barium sulfate.

4. A gasket-forming composition of a thixotropic plastisol mixture comprising:
A. about 75 to 230 parts of a plasticizer composition consisting essentially of from about 60 to 90 parts diester plasticizer and from about 60 to 90 parts epoxide plasticizer;
B. about 100 parts of chloride resin dispersed in the plasticizer composition;
C. about 25 to 125 parts of precipitated barium sulfate; and
D. about 50 parts to 325 parts of water-ground barium sulfate, wherein the total of the two barium sulfate materials is not more than 380 parts.

5. The gasket forming composition of claim 4 wherein the diester plasticizer is di-2-ethylhexyl adipate and wherein the epoxide plasticizer is an epoxidized soybean oil.

* * * * *